3,073,876
Patented Jan. 15, 1963

3,073,876
PROCESS FOR THE MANUFACTURE OF POLYBUTENES
John B. McMaster, Richmond, Calif., assignor to California Research Corporation, San Francisco, Calif., a corporation of Delaware
No Drawing. Filed Dec. 29, 1960, Ser. No. 79,130
3 Claims. (Cl. 260—683.15)

This invention relates to the production of hydrocarbon polymers from butenes and more particularly to process improvements in the production of such polymers whereby the viscosity of the polybutene produced can be accurately controlled.

Hydrocarbon polymers derived from butenes are very valuable and have been produced commercially for some time. The polymers are produced in several viscosity grades and are used as lubricating compounds, adhesives, calking compounds, cable oils, capacitor insulation, etc., depending upon the viscosity of the particular grade.

These butene polymers are produced by contacting a hydrocarbon stream containing butenes and butanes in liquid phase with an aluminum chloride catalyst in a polymerization reactor at temperatures within the range of about −100 to 120° F. The viscosity of the polymers produced may be controlled by regulating the catalyst concentration and reaction temperature. Lower catalyst concentrations and lower temperatures give polymers of higher viscosity. The polymers produced are withdrawn from the reaction zone and separated from catalyst-containing tars and unreacted butenes and butanes.

In the practice of this process, difficulties have been encountered in controlling the viscosity of the polymers produced. The process often results in the production of a body of polymers having such a broad range of molecular weights that extensive processing is necessary to isolate any particular desired polymer fraction having a desired viscosity. Furthermore, in many instances it has been difficult to produce polymers of extremely high viscosity because the high molecular weight products which would give such extremely high viscosity are contaminated with lower molecular weight polymers which are difficult to separate and substantially reduce the viscosity of the mixture.

In the past, the problem has been solved by introducing sulfur dioxide into the polymer mass after it has been withdrawn from the polymerization reactor and before the subsequent separation and purification steps of the process. Sulfur dioxide, however, is a corrosive substance and in its application may require special precautions, equipment, and materials handling to avoid problems arising from corrosion and deterioration within the process system.

It has now been found that the viscosity of the polymer mass produced by this process can be accurately controlled by introducing a minor amount of a lower alkyl primary amine, e.g., methylamine, ethylamine, propylamines and butylamines, preferably isopropylamine, into the total effluent from the polymerization reactor prior to the subsequent separation and purification steps of the process. When this practice is followed, the molecular weight, and hence viscosity, of the polymer can be accurately controlled by regulating the reaction temperature and catalyst concentration. By this method, at any given set of operating conditions the mass of polymers produced will have a narrow range of molecular weights. The practice of the present invention permits the production of polymers of controlled viscosity without extensive separation of polymer fractions, and permits the production of polymers of extremely high viscosity uncontaminated by lower viscosity materials. The process is of particular utility for the production of polymers having a viscosity above about 750 seconds Saybolt Universal at 210° F. The use of the lower alkyl primary amines of the invention has substantially reduced, if not eliminated, the problems of corrosion presented by the use of sulfur dioxide in the prior art. Furthermore, the lower alkyl primary amines are easily removable from the system in the flashing steps, thereby avoiding any undesirable contamination of the polymer product.

The hydrocarbon feed stock comprises essentially hydrocarbons, preferably those derived from the olefin-containing gases produced in the thermal or catalytic cracking of petroleum oils, distillates or residuum, although other olefin-containing materials may be used. The feed should contain, in the major part, hydrocarbons having four carbon atoms per molecule, and hence may contain substantial quantities of butanes, 1- and 2-butenes, and isobutene. While isobutene is the most desirable olefin feed for the polymerization, it is advantageous to employ a feed mixture containing other butenes which enter the polymerization to a lesser extent, and butanes which serve as a diluent in the process, adding fluidity to the reaction mass and dissipating the heat of the polymerization reaction.

In a preferred embodiment of the invention, the hydrocarbon feed is washed, first with caustic and then with water, to remove acidic and water-soluble impurities, and then dried and passed to the polymerization reactor.

The catalyst is prepared by dissolving aluminum chloride in an inert hydrocarbon solvent, such as butane, propane, isobutane, etc. The concentration of catalyst in the reaction zone may be controlled either by regulating the rate of feed of the catalyst solution into the reactor or by controlling the concentration of aluminum chloride in the solvent. A desirable concentration may be selected by regulating the temperature while saturating the solvent with catalyst. Higher temperatures permit higher catalyst concentrations. The saturation temperature of the solvent and the flow rate of the catalyst solution in the polymerization reactor are controlled so that aluminum chloride is fed to the reactor in an amount of from 0.01 to 5.0 pounds, preferably 0.03 to 1.0 pound of aluminum chloride per barrel of hydrocarbon feed. If desired, a slight excess of solvent may be employed to avoid deposition of aluminum chloride in subsequent conduits should the temperature drop slightly.

After saturation, the catalyst solution is dried and passed to the polymerization reactor. This reactor is maintained under superatmospheric pressure sufficient to maintain the reactants in liquid phase. To achieve this, the various streams are delivered to the reactor at elevated pressures. The reactor is maintained at a temperature within the range of about −100 to 120° F. depending on the rate of catalyst feed thereto and the desired viscosity of the polymer product. The residence time of the olefin in the reactor may be from about 5 to 60 minutes or higher.

The total effluent from the polymerization reactor is then contacted with the desired lower alkyl primary amine. The quantity of amines introduced should be between about 40 and 400, preferably 200 and 300, parts by volume per million parts by volume of polymer mixture.

After contact with amine, the mixture is passed to a settler wherein the bulk of the catalyst-containing tar is deposited on large aggregate and withdrawn from said settler. The remaining polymer mixture is then passed through a fine clay filter to remove the rest of the tar.

The polymer product is further refined by a high pressure flashing followed by a low pressure flashing. The first flash is carried out at about 350° to 450° F. and 3–6 atmospheres pressure in order to remove from the rest of the mixture unreacted hydrocarbons containing predominantly four carbon atoms per molecule which may be recycled, if desired. In the second flash, carried out at 350°–450° F. and 10–200 mm. pressure, the light polymers, i.e., up to about twenty carbon atoms per molecule, and any remaining amines are removed from the polymer mixture.

When the process is practiced in accordance with the above description, polymers of uniform, high viscosity having a narrow range of molecular weights can be produced, and the viscosity of the polymer produced can be controlled accurately by controlling the hydrocarbon feed rate, the temperature of reaction, and the catalyst flow rate into the reactor.

The process, having been described in detail, is further illustrated by the following examples using a butene feed obtained from the cracking of petroleum oils made up primarily of isobutene, but containing a proportion of 1- and 2-butenes. Example 1 shows the effect of isopropylamine. In Run I of Example 1, no isopropylamine was employed. In Run II, isopropylamine was introduced into the polymer stream effluent from the reaction zone at a rate of 240 parts by volume per million parts by volume of polymer mixture. Example 2 shows the effect of ethylamine. In Run I of Example 2, no amine was used. In Run II, ethylamine was introduced into the polymer stream effluent from the reaction zone at a rate of 240 parts by volume per million parts by volume of polymer mixture.

*Example 1*

|  | I | II |
|---|---|---|
| Hydrocarbon feed (barrels) | 1,500 | 1,500 |
| AlCl₃ catalyst (lbs. per barrel of feed) | .1135 | .1175 |
| Isopropylamine (p.p.m.) | 0 | 240 |
| Reactor temp. (° F.) | 58 | 57 |
| First flash: |  |  |
|    temp. (° F.) | 385 | 375 |
|    pressure (p.s.i.g.) | 46 | 61 |
| Second flash: |  |  |
|    temp. (° F.) | 417 | 406 |
|    pressure (mm. of Hg) | 40 | 53 |
| Heavy polymer yield (barrels) | 171 | 157 |
| Heavy polymer viscosity (SSU at 210° F.) | 500 | 834 |

*Example 2*

|  | I | II |
|---|---|---|
| Hydrocarbon feed (barrels) | 1,450 | 1,450 |
| AlCl₃ catalyst (lbs. per barrel of feed) | .0517 | .0538 |
| Ethylamine (p.p.m.) | 0 | 240 |
| Reactor temp. (° F.) | 33 | 35 |
| First flash: |  |  |
|    temp. (° F.) | 320 | 300 |
|    pressure (p.s.i.g.) | 55 | 53 |
| Second flash: |  |  |
|    temp. (° F.) | 370 | 360 |
|    pressure (mm. of Hg) | 15 | 15 |
| Heavy polymer yield (barrels) | 274 | 257 |
| Heavy polymer viscosity (SSU at 210° F.) | 1,500 | 3,200 |

These examples illustrate the production of polymers under comparable conditions with and without the use of amines. The use of a primary amine in accordance with this invention produced a comparable yield of polymer, but the polymer mass obtained using isopropylamine had a viscosity 1.67 times as high as that obtained when the amine was not employed. Using ethylamine, the polymer mass obtained had a viscosity of more than twice that of the product without the amine.

As will be evident to those skilled in the art, various modifications on this process can be made or followed, in the light of the foregoing disclosure and discussion, without departing from the spirit or scope of the disclosure or from the scope of the claims.

What is claimed is:

1. In a process for producing butene polymers of high viscosity by contacting in liquid phase a butene-containing hydrocarbon feed with aluminum chloride in a reaction zone, passing the effluent from the reaction zone comprising butene polymers, unreacted hydrocarbons, and aluminum-containing tars into a settling zone to separate a hydrocarbon phase and an aluminum chloride tar phase, and distilling the hydrocarbon phase to separate unreacted hydrocarbons overhead and butene polymers as a bottoms product, the method of producing a butene bottoms product having a narrow range of polymer molecular weights which comprises introducing into the effluent from the reaction zone prior to completion of the separation of the aluminum chloride tar phase from the effluent an alkyl primary amine having 1 to 4 carbon atoms in an amount of 40 to 400 parts by volume per million parts by volume of the effluent.

2. In the process for producing hydrocarbon polymers of high viscosity by contacting in liquid phase a hydrocarbon mixture consisting, in the major part, of normal and isobutenes and butanes with anhydrous aluminum chloride in a reaction zone at a temperature within the range of −100 to 120° F. to produce a reaction mixture containing said hydrocarbon polymers, unreacted butenes and butanes, and aluminum-containing tars, removing said product mixture from said reaction zone, and separating said tars and unreacted butenes and butanes from said product mixture, the improvement comprising producing hydrocarbon polymers having a narrow molecular weight range and having an average viscosity greater than 750 seconds Saybolt Universal at 210° F. by introducing into said product mixture after it has been removed from said reaction zone, and prior to completion of the separation of said tars from said product mixture, an alkyl primary amine having 1 to 4 carbon atoms in an amount of 40 to 400 parts by volume per million parts by volume of the product mixture.

3. In a process for producing butene polymers having viscosities above about 750 SSU at 210° F. by contacting in liquid phase a butene-containing hydrocarbon feed with aluminum chloride in a reaction zone, passing the effluent from the reaction zone comprising butene polymers and unreacted hydrocarbons into a settling zone to separate a hydrocarbon phase and an aluminum chloride tar phase and distilling the hydrocarbon phase to separate unreacted hydrocarbons overhead and butene polymers as a bottoms product, the method of increasing the viscosity of the butene polymer bottoms product which comprises introducing into the effluent from the reaction zone prior to completion of the separation of the aluminum chloride tar phase from the effluent an alkyl primary amine having 1 to 4 carbon atoms in an amount of 40 to 400 parts by volume per million parts by volume of the effluent.

References Cited in the file of this patent

UNITED STATES PATENTS

| 2,469,725 | Heinrich | May 10, 1949 |
| 2,569,383 | Leyonmark et al. | Sept. 25, 1951 |
| 2,777,890 | Ikeda | Jan. 15, 1957 |